United States Patent
Cai et al.

(10) Patent No.: US 9,870,312 B2
(45) Date of Patent: *Jan. 16, 2018

(54) GENERATING REUSABLE TESTING PROCEDURES

(71) Applicant: International Business Machines Corporation, Armonk, NY (US)

(72) Inventors: Zhu Hong Cai, Beijing (CN); Dong Rui Li, Beijing (CN); Miao Liu, Beijing (CN); Ying Shen, Beijing (CN); Kui Song, Beijing (CN); Wen Yin, Beijing (CN); Dan Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,045

(22) Filed: Dec. 23, 2016

(65) Prior Publication Data

US 2017/0270034 A1    Sep. 21, 2017

Related U.S. Application Data

(63) Continuation of application No. 15/070,553, filed on Mar. 15, 2016.

(51) Int. Cl.
*G06F 11/36* (2006.01)
*G06F 9/44* (2006.01)

(52) U.S. Cl.
CPC ............ *G06F 11/3684* (2013.01); *G06F 8/38* (2013.01); *G06F 11/3664* (2013.01); *G06F 11/3692* (2013.01)

(58) Field of Classification Search
CPC ...... G06F 11/3664; G06F 3/0482; G06F 8/38; G06F 11/3684
See application file for complete search history.

(56) References Cited

U.S. PATENT DOCUMENTS

| 7,559,001 B2 | 7/2009 | Betawar et al. |
| 7,840,851 B2 | 11/2010 | Hayutin |

(Continued)

OTHER PUBLICATIONS

Mehaffy et al, "IBM's Test Automation Strategy: Build your test automation architecture around IBM Rational Quality Manager", IBM developerWorks, Aug. 31, 2010. pp. 1-11.

(Continued)

*Primary Examiner* — Li B Zhen
*Assistant Examiner* — Amir Soltanzadeh
(74) *Attorney, Agent, or Firm* — Michael T. Fulton (57) ABSTRACT

A selection of a plurality of graphical user interface (GUI) components of a GUI is received. The selection is received so that the GUI can be tested. Attributes of the selection of GUI components are determined. Using the attributes, a default procedure for testing the GUI is determined. The default procedure includes a first set of input values for GUI components of the plurality of GUI components. The default procedure includes a first sequence in which the first set of input values are provided. Modifications to the default procedure are received. Using the modifications, a final procedure with a second set of input values provided in a sequence is generated. The GUI is tested with the final procedure. Testing the GUI includes providing the second set of input values to respective GUI components in the second sequence.

1 Claim, 4 Drawing Sheets (56) References Cited

U.S. PATENT DOCUMENTS

| | | |
|---|---|---|
| 7,856,619 B2 | 12/2010 | He et al. |
| 8,140,986 B2 | 3/2012 | Zhao |
| 8,347,147 B2 | 1/2013 | Adiyapatham et al. |
| 8,978,020 B2 | 3/2015 | Rossi |
| 2007/0234121 A1* | 10/2007 | He ................... G06F 11/3684 714/33 |
| 2009/0089688 A1 | 4/2009 | Zhao |
| 2009/0132950 A1* | 5/2009 | Gibson ............ G06F 17/2725 715/780 |
| 2009/0199096 A1 | 8/2009 | Pop-Jordanov et al. |
| 2011/0016453 A1 | 1/2011 | Grechanik et al. |
| 2013/0262934 A1 | 10/2013 | Zhang et al. |

OTHER PUBLICATIONS

Cai et al., "Generating Reusable Testing Procedures," U.S. Appl. No. 15/070,553, filed Mar. 15, 2016.

List of IBM Patents or Patent Applications Treated as Related, Signed Dec. 23, 2016, 2 pages.

\* cited by examiner

GENERATING REUSABLE TESTING PROCEDURES

BACKGROUND

Graphical user interfaces (GUIs) are becoming increasingly complex. Part of this complexity includes standard user inputs that require specific entries into numerous fields of a GUI. As GUIs become more complex, it is necessary to test the increasingly elaborate functionality behind the GUI.

SUMMARY

Embodiments of the disclosure provide a method, system, and computer program product for generating reusable testing procedures. A selection of a plurality of graphical user interface (GUI) components of a GUI may be received. The selection may be received so that the GUI can be tested. The plurality of GUI components may be used in the future by a GUI user when executing GUI commands. Attributes of the plurality of GUI components may be determined. Attributes may include admissible input values of respective GUI components. A default procedure for testing the GUI may be determined. The default procedure may include a first set of input values for GUI components of the plurality of GUI components. The default procedure may include a first sequence in which the first set of input values are provided. Modifications to the default procedure from a developer may be received. A final procedure may be generated using the modifications. The final procedure may include a second set of input values to be provided to the GUI components in a second sequence. The final procedure may simulate the GUI commands. The GUI may be tested with the final procedure. Testing the GUI may include providing the second set of input values to respective GUI components in the second sequence. The testing procedure may be stored in a database. The testing procedure may be retrieved in response to a prompt. The GUI may be tested again using the testing procedure.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to generating reusable testing procedures for graphical user interfaces (GUIs). A GUI can include any number of GUI input component that allow a user to manipulate the GUI. A selection of these GUI input components is received. Properties of the selected GUI input components are determined. Using these properties, a default procedure is generated and provided to an operator. The operator uses the properties to modify the default procedure with specific values in a specific order to generate a testing procedure. This testing procedure may aim to simulate an expected GUI command of a future user. The testing procedure is used to test the GUI, after which results of the test are gathered and the procedure is stored. When the GUI input components are later referenced, the saved testing procedure may be retrieved and modified by a developer, at which point the GUI can be retested. While the present disclosure is not necessarily limited to such applications, various aspects of the disclosure may be appreciated through a discussion of various examples using this context. Examples and example values discussed herein are provided by way of example only and are not to be construed as limiting.

When using conventional testing methodology to test a GUI, a developer may first gather information about GUI input components and write sub-methods that can, for example, return objects that enable the manipulation and query of GUI input component. A developer may then use conventional testing methodology to create a set of individual procedures that use the sub-methods to replicate and automate common GUI commands. These procedures may then be compiled into a comprehensive test case that navigates through an application, verifies the state of the application, and logs results of the application. However, in instances where GUIs have a plurality of expected/common GUI commands that should be tested and many of these GUI commands require a plurality of specific inputs across a plurality of GUI input components, the intermediate step of individually creating processes may be time consuming and error prone.

Aspects of the disclosure are directed towards generating reusable testing procedures to reduce the likelihood of errors and/or the amount of time to create processes for testing a GUI as compared to the conventional testing methodology discussed above. For example, in some embodiments, a testing program may be used to generate reusable testing procedures. In particular, a developer may use the testing program to select a plurality of GUI input components. The testing program may analyze the selected GUI components to determine the attributes of each GUI component. Using these attributes, the testing program may determine admissible values for respective GUI components. With the admissible values the testing program may generate a default procedure. The default procedure may include a set of inputs for the GUI input components. The default procedure may be provided to the developer. The developer may modify the default procedure using the testing program to generate a final procedure that simulates an expected GUI command that a future user would enter on the GUI. The final procedure may include a plurality of different inputs across a variety of distinct GUI input components. For example, some GUI components may be drop-down menus, while other GUI components are fillable fields, while other GUI components are mutually exclusive toggles (e.g., a back button and a forward button on the GUI). The final procedure may include a precise sequence to how some or all inputs are entered into the GUI. The final procedure may be executed and results may be gathered.

The final procedure may be stored in such a way that the final procedure is associated with the GUI components of the GUI. As such, a developer may, at a later point in time, use the testing program to select a GUI component of the GUI. If the GUI component was included in the final procedure, the final procedure may be visible as an available procedure. A developer may call up the final procedure and retest the GUI component with the same procedure, or the developer may use the final procedure as a starting point from which to create a new procedure that tests functionality of the GUI component.

Figure 1:
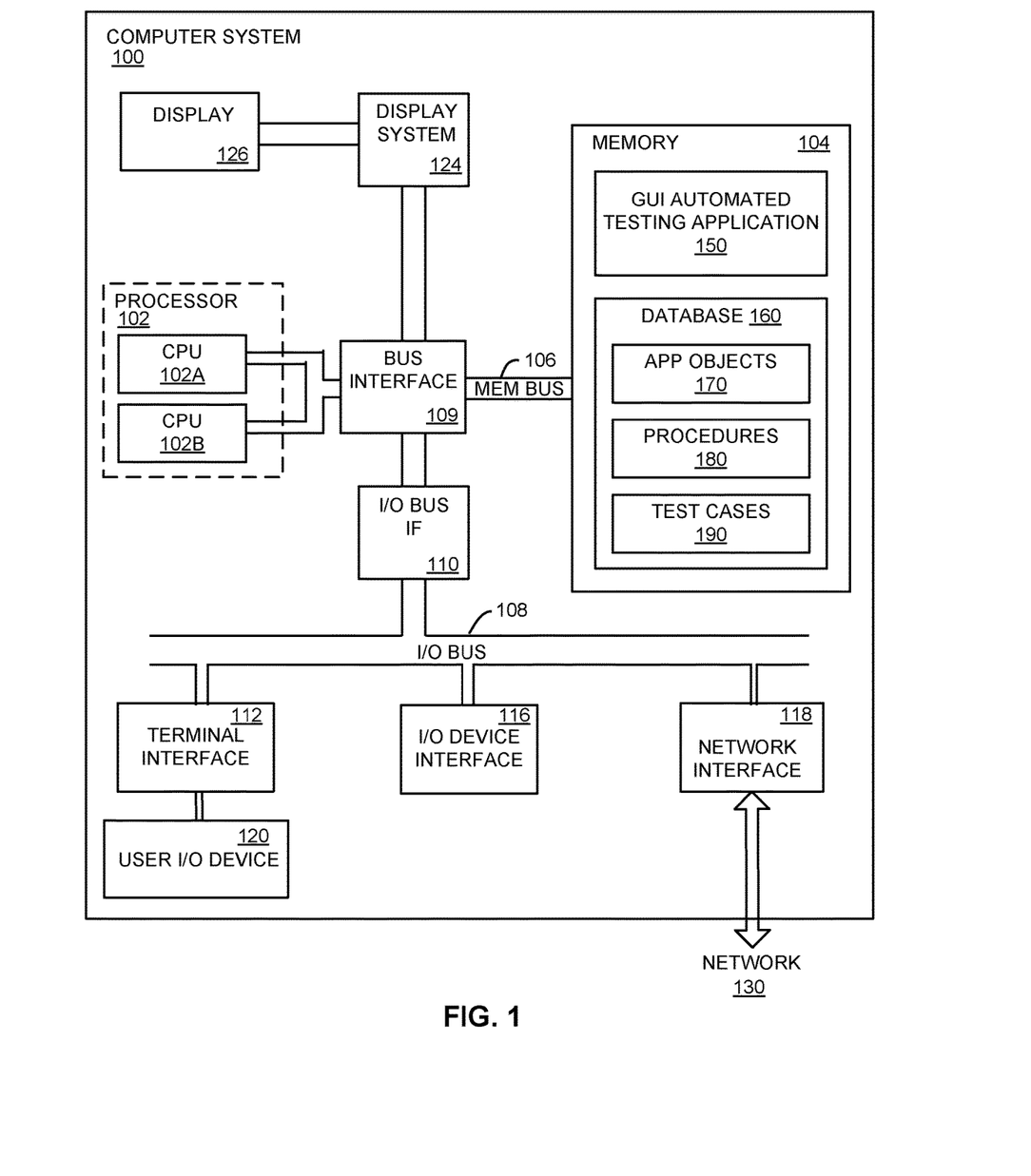
FIG. 1 is an apparatus for generating reusable testing procedures for Graphical User Interfaces (GUIs), according to embodiments.

FIG. 1 depicts a high-level block diagram of a computer system 100 for generating reusable testing procedures. The components of the various embodiments disclosed herein apply equally to any appropriate computing system. The components of the example computer system 100 shown in FIG. 1 include a memory 104, a terminal interface 112, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may include one or more general-purpose programmable central processing units (CPUs) 102A and 102B, herein generically referred to as the processor or processors 102. In some embodiments, the computer system 100 may contain multiple processors. In other embodiments, the computer system 100 may alternatively be a single CPU system. Each processor 102 executes instructions—such as the instructions from the GUI automated testing application 150 to perform the acts described with respect to method 200—stored in the memory 104.

In some embodiments, the memory 104 may include a random-access semiconductor memory, storage device, or storage medium (either volatile or non-volatile) for storing or encoding data and programs. The memory 104 can include stored data such as a database 160 which contains data on application objects (app objects) 170, procedures 180, or test cases 190. The database may relate to data of one or more GUIs and a plurality of GUI components on the one or more GUIs.

Figure 3:
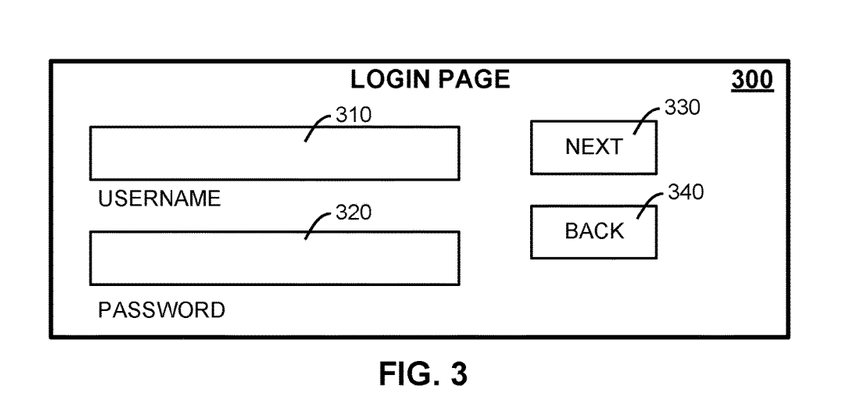
FIG. 3 is a depiction of a user login GUI, according to embodiments.

App objects 170 may include information about the GUI components, such as the type of component (e.g., a drop-down menu, a fillable field, an upload link, a Boolean option, etc.), data on the potential inputs for the component (e.g., the options of a drop-down menu, a character limit for the fillable field, allowable file formats, etc.), and potentially sub-methods for manipulating a specific app object (e.g., a method of selecting a calendar date for a date-selection field). Procedures 180 are operations that replicate actions that users will make on the GUI and are generated by an operator utilizing the automated testing application 150. For example, looking to FIG. 3, a login GUI 300 is depicted. This GUI 300 includes a username field 310, a password field 320, and two buttons that say "next" 330 and "back" 340. A developer may generate a testing procedure 180 using the automated testing application 150 that relates to logging in using various usernames and passwords. Procedures 180 may use data from app objects 170 to execute. For example, using the login page GUI 300, procedures 180 may include a set of dozens of different inputs for the username field 310 and password field 320 combinations, including "incorrect" sequences like pressing "next" 330 before a username has been entered, to test the functionality of the login GUI 300. Test cases 190 may include a series of procedures 180 that together verify a set of functionality of the application that is hosting the GUI. Tests cases 190 may verify functionality across all or many GUIs of the application by navigating through the application, verifying application states (e.g., in comparison to expected states), and collecting/compiling/logging results. For example, a test case may verify that a welcome page GUI correctly responds to GUI commands to bring a user to the login GUI 300, and that from the login GUI 300 an "incorrect" set of GUI commands will bring an error prompt, while a "correct" set of GUI commands will bring the user to a user homepage.

In certain embodiments, the memory 104 represents the entire virtual memory of the computer system 100, and may also include the virtual memory of other computer systems coupled to the computer system 100 or connected via a network. In such embodiments, portions of the database 160 such as the app objects 170, procedures 180, or test cases 190 may be stored in other computer systems of the network 130, and the GUI automated testing application 150 may access the database 160 through the network interface 118.

The memory 104 may store all or a portion of the various programs, modules and data structures for generating reusable testing procedures as discussed herein. For instance, the memory 104 can include the application that hosts the GUI. In this illustrative embodiment, the hosting application includes instructions or statements that execute on the processor 102 to carry out functions (e.g., the acts of method 200) as further described below. For example, the hosting application may act in response to a procedure of the GUI automated testing application 150 by altering the GUI as per the underlying code of the hosting application.

In the depicted embodiment, the computer system 100 includes a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126, such as a standalone display screen, computer monitor, television, or a tablet or handheld device display. The display device 126 may display the GUI that is being tested by the GUI automated testing application 150. The display device 126 may display any visual effects caused by procedures 180 being executed by processors 102 on behalf of the GUI automated testing application 150, for which the display system 124 may include a dedicated memory for buffering video data. The display device 126 may additionally display a result page depicting analytics for executed procedures 180 ordered by the GUI automated testing application 150.

In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A developer that is using the GUI automated testing application 150 may manipulate a GUI and modify/retrieve procedures using an input device. For example, a computer system 100 which includes an I/O device 120 may allow a developer to graphically select a set of graphical icons on the GUI using input devices 120 such as, but not limited to, a mouse and a graphical display. In other embodiments, developer selections or procedure modifications may be made by a separate computer system on the network that is analogous to computer system 100, and such developer selections or procedure modifications may be submitted to the GUI automated testing application 150 through the network interface 118.

The I/O device interface 116 provides an interface to any of various other I/O devices or devices of other types, such as printers or fax machines. The network interface 118 provides one or more communication paths from the computer system 100 to other digital devices and computer systems.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

FIG. 1 depicts several example components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
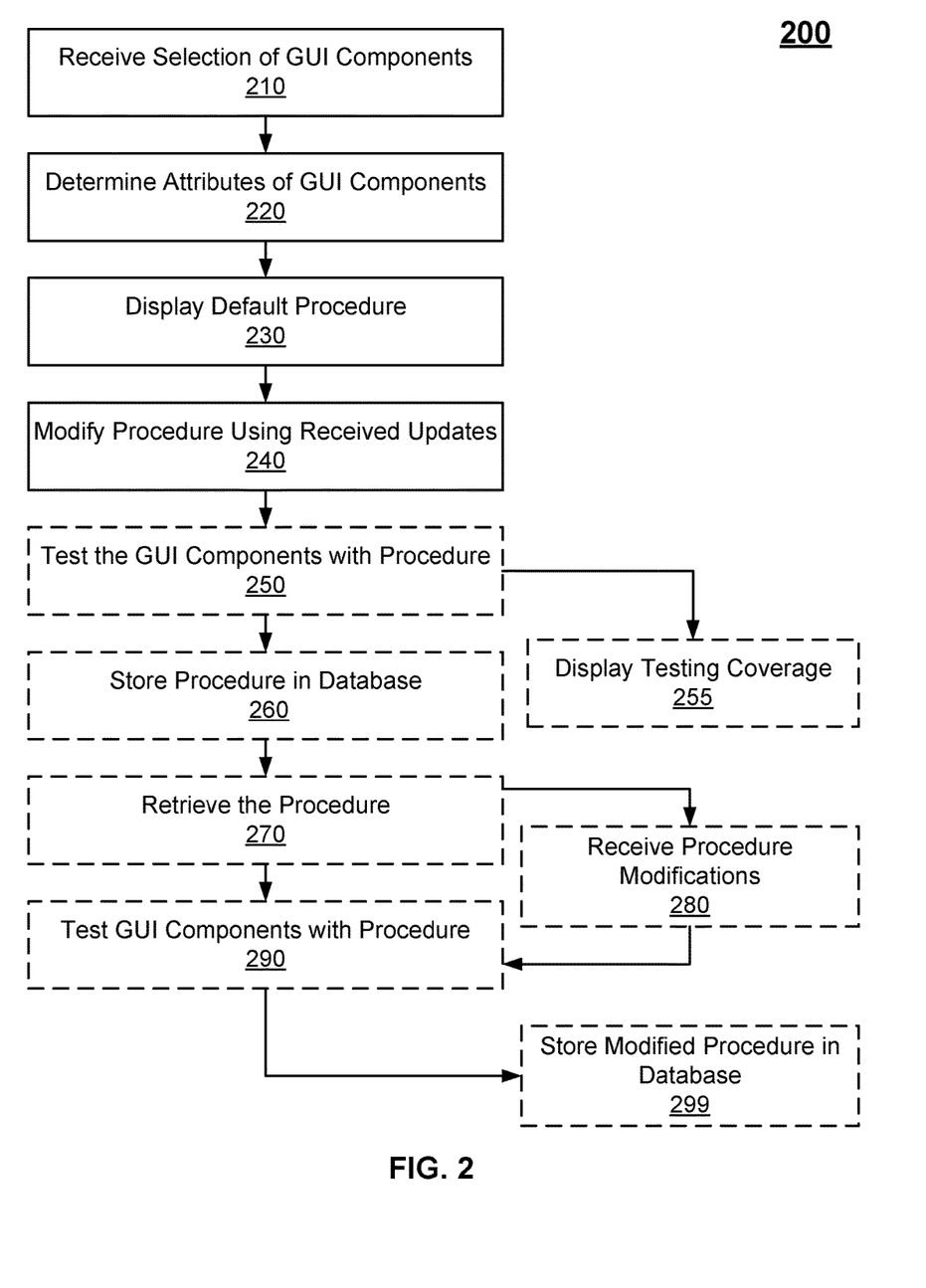
FIG. 2 is a method of generating reusable testing procedures for GUIs, according to embodiments.

FIG. 2 is a flowchart illustrating a method 200 for generating reusable testing procedures for GUIs. These procedures are substantially similar to the procedures 180 of FIG. 1 that replicate/simulate GUI commands of a user. Procedures may be compiled and executed in a complete test plan that navigates through numerous GUIs of an application and gathers and logs data on the test. An operator may use a GUI automation testing program (hereinafter referred to as a testing program) to generate and store the reusable testing procedures as described herein. An operator may use the testing program to verify that GUIs work as intended, specifically doing so by replicating mass amounts of common or expected GUI commands (e.g., future actions by users of the GUI upon the GUI) in a single automated session. The testing program and the procedure database may reside on one or more computers, such as the computing device 100 as discussed above. Likewise, the program that hosts the GUI that is being tested by the testing program may reside on a computer such as the computing device 100 discussed above.

In some embodiments, procedures may simulate GUI commands by calling on another "tier" of information as stored by the testing program. For example, the testing program may organize data in a "bottom" tier of app object data (e.g., data on GUI components that allows procedures to query and manipulate GUI components), an "intermediate" tier of procedures for individual GUIs of an application, and a "top" tier for complete test cases that utilize a plurality of procedures to navigate through numerous GUIs of an application to test the end-to-end functionality of an application. In such a multi-tiered testing program, the program may work from a bottom tier to a top tier, such that the bottom tier is fully populated with data before the intermediate tier is generated, and the intermediate tier is fully populated before the top tier is generated. It is to be understood that testing program paradigms other than those that use a bottom tier (e.g., a tier regarding app objects), intermediate tier (e.g., a tier regarding procedures), and top tier (e.g., a tier regarding complete test cases) may be used in other embodiments. However, for the sake of clarity, data regarding GUI components is referred to herein as app object data that is easily retrievable (i.e., as a result of GUI component data existing in a "lower" data tier that is fully populated).

Figure 4:
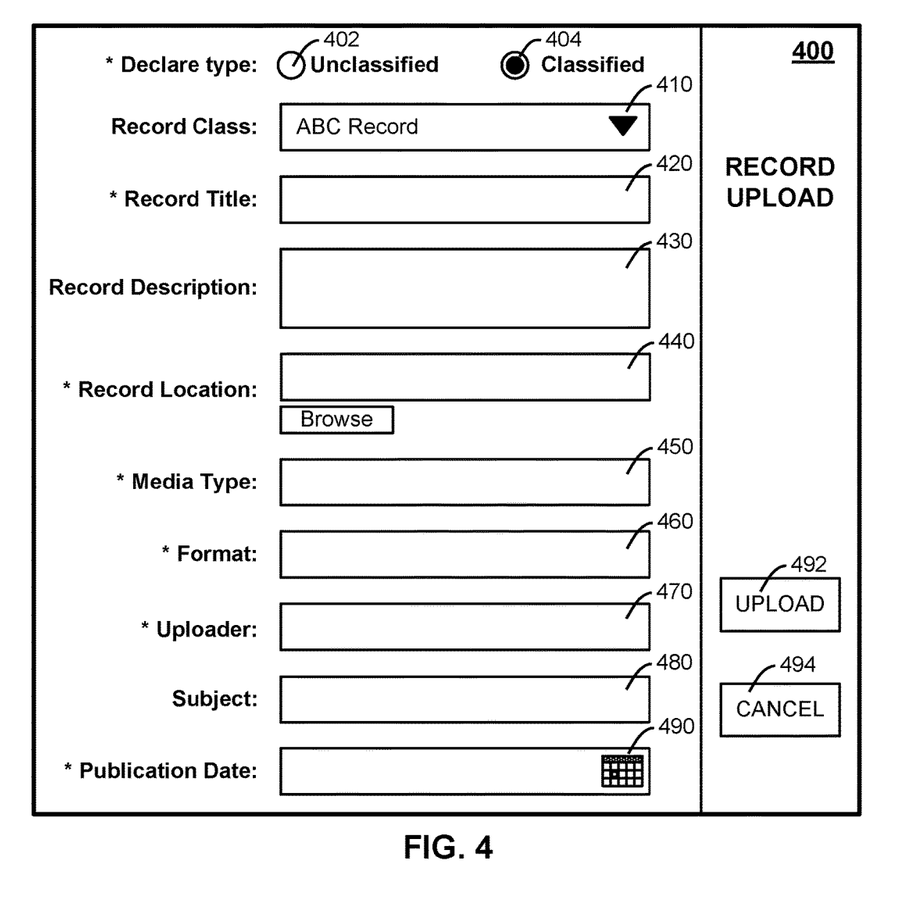
FIG. 4 is a depiction of a record upload GUI, according to embodiments.

The method 200 of FIG. 2 is discussed in conjunction with the GUI 400 depicted in FIG. 4 for purposes of clarity. It is to be understood that method 200 may be used to generate reusable procedures for GUIs other than the GUI 400, however. Blocks with hashed lines in FIG. 2 are optional steps within method 200. The visual arrangement of blocks in the flowchart of FIG. 2 is not to be construed as limiting the order in which the individual acts/operations may be performed, as certain embodiments may perform the operations of FIG. 2 in alternative orders.

At block 210 a selection of GUI components is received. The selection is of one or more GUI components. A GUI component is a graphical element of a GUI that can be graphically manipulated to provide an input from a user of the GUI to the application hosting the GUI. The GUI components are within a GUI that is to be tested. The selection may be made by a developer using a testing program that is testing the GUI. The GUI may be tested to verify that the GUI executes as expected during a plurality of common or expected GUI commands. These GUI commands may include both the intended use of the GUI (e.g., wherein inputs are provided in the manner expected/suggested by developers of the GUI) and also the disfavored use of the GUI (e.g., wherein inputs are attempting to hack or break the GUI). The selected GUI components may be the components that are required to replicate the GUI command.

For example, looking to FIG. 4, a record upload GUI 400 is depicted. The GUI 400 includes eight fields that must be completed before a record can be uploaded as indicated by an asterisk (e.g., declare type, record title, record location, media type, format, uploader, and publication date). Projecting that a user may skip steps that are not required, a developer may select the ten GUI components 402, 404, 420, 440, 450, 460, 470, 490, 492, 494 associated with the required steps. In some embodiments, a developer may select the graphical components graphically, such as by using a "click-and-drag" technique to grab all components in a graphical box or by control-clicking each selected GUI component in succession. In this embodiment, there are two more GUI components than there are required fields as a result of two pairs of mutually exclusive fields 402 & 404, 492 & 494 in the GUI 400. A set of mutually exclusive GUI components includes a plurality of GUI components for which only one GUI component may be activated or selected in a given instance.

The selection of GUI components may include an identified set of mutually exclusive GUI components. Mutually exclusive GUI components include a set of GUI components for which only a single GUI component may be selected/specified/"clicked" in a single instance. For example, looking at the record upload GUI 400 of FIG. 4, two sets of mutually exclusive components are present. The first set is the "declare type" GUI components 402, 404 and the second set includes the UPLOAD 492 and CANCEL 494 buttons. Specifically, a single testing instance could not select/"click" both the Unclassified GUI component 402 and the Classified GUI component 404, and likewise a single testing instance could not select/click both the UPLOAD 492 and CANCEL 494 buttons. A developer may identify all sets of mutually exclusive GUI components that exist within the selection of GUI components, and the testing program may recognize this identification.

Looking back to FIG. 2, at block 220 attributes of the selected GUI components are determined. The attributes may be determined by the testing program. Attributes are equivalent to application objects (e.g., app objects) as used herein. Attributes include the type of admissible/acceptable input of a GUI component (e.g., characters, a selection from a drop-down menu, one selection of mutually exclusive set, an uploaded file, a calendar date, etc.). Attributes may also include a sub-process for providing input for a GUI component. For example, looking at GUI 400, GUI component 490 may require a date that is provided in a three-step sub process. The first step may be graphically selecting the GUI component 490 (e.g., using a computer mouse to click within the box of GUI component 490), the second step may be navigating to the desired date using techniques known to one skilled in the art (e.g., using a computer mouse to graphical select arrows to go forward or back in time until a desired calendar month of a desired calendar year is displayed), and the last step may be graphically selecting the desired date (e.g., using a computer mouse to graphically click on the desired date).

In some embodiments, attributes of GUI components are determined before procedures are determined. For example, in certain embodiments, attributes of GUI components are determined at the beginning of method 200. In some embodiments, the testing program determines the attributes of GUI components. In other embodiments, attributes of GUI components are determined by a developer.

At block 230, a default procedure is displayed to a developer. The displayed default procedure acts as a prompt for the developer to transmit any desired modifications regarding the default procedure to the testing program. The default procedure may include typical or expected input values for the selected GUI components as determined by the testing program. Expected input values may be gathered or derived from the GUI attributes of the GUI components. For example, if the GUI attributes specify that the respective GUI component will process between 1 and 10 alphanumeric characters as an input, the testing program may generate an expected input value within this admissible range. Alternatively, if the GUI attributes specify that the respective GUI component will process a single selection of the ten options of a drop-down menu, the expected input value generated by the testing program may be one of these ten options. In other embodiments, typical input values are gathered from historical databases of corresponding GUI components. For example, if the GUI component is for a human identifier (e.g., GUI component Uploader 470), the testing program may reference a historical database of typical user names to generate a typical input value.

Determining the default procedure may include selecting a single GUI component of any sets of mutually exclusive components that were identified by the developer within the selection received at block 210. In some embodiments, the selection may not identify a set of mutually exclusive components though a set of mutually exclusive components exist within the selection. In such embodiments, as part of determining the default procedure, the testing program may determine that a set of mutually exclusive components exists using the attributes of GUI components. Once a set of mutually exclusive components is identified, the testing program may then select a single GUI component of the set of mutually exclusive components as part of the default procedure.

When determining the default procedure, the testing program may set a sequence in which the GUI input values are entered into respective GUI components. A sequence may be determined for GUIs in which GUI input values must be entered into respective GUI components in a specific order for a GUI command to execute properly. For example, looking at the record upload GUI 400, the sequence may specify that the GUI component UPLOAD 492 is entered after all other GUI components of the GUI 400 have been provided GUI input values. For another example, some GUIs may have "tabs" as GUI components that display different subsets of GUI components, and a sequence may specify that a procedure begins with a specific tab GUI component being selected to display a desired subset of GUI components, after which subsequent GUI components may be provided respective input values. The testing program may detect such sequence requirements by analyzing the GUI attributes and create a permissible sequence that satisfies said sequence requirements.

Alternatively, some GUIs may not require a sequence. For example, a GUI may simply include a few buttons, any of which will immediately exit the current GUI and call a different GUI. Additionally, a GUI may immediately execute a GUI command as soon as a subset of GUI components are provided input values, regardless of the order in which said input values are provided. For such GUIs, a default procedure may be determined that does not include a sequence.

In certain embodiments, a default procedure may include the code/scripts for entering GUI input values into respective GUI components without including the actual values into said code/scripts. For example, if the selected GUI components include the ten selected GUI components of GUI 400 described above (402, 404, 420, 440, 450, 460, 470, 490, 492, and 494) but, as described above, only eight input values are allowed by the GUI, the default procedure may include code to enter eight values that correspond to eight of the ten selected GUI components, without actually specifying the eight input values.

At block 240, updates to the default procedure are received. The updates are sent by a developer to the testing program in regards to the default procedure. The updates modify the default procedure to generate a final procedure for testing the selected GUI components. The final procedure includes a final set of inputs for GUI components of the selected GUI components. The final procedure may replicate/simulate an expected GUI command upon the GUI (e.g., logging into a program, uploading a record, attempting to hack the GUI, etc.) to the satisfaction of the developer. The final procedure may include a plurality of inputs utilizing a plurality of sub-processes upon a plurality of GUI components.

In generating the final procedure the testing program may receive developer selections of GUI components for parametrizing. A developer may select GUI components for parametrizing within the procedure updates. Parametrizing a GUI component includes providing a plurality of input values across one or more procedures to a certain GUI component. The testing program may receive either a request for parametrization or hard-coded values for each GUI component in a sequence.

For example, looking at FIG. 4, the testing program may receive a request to parametrize GUI component Record Title 420. As a result of being selected by the developer for parametrization, scores or hundreds of GUI input values may be entered into GUI component Record Title 420 during testing. In some embodiments, a single procedure may include all details of parametrizing GUI component Record Title 420, such that a single procedure includes the code for the scores or hundreds of characters that will be entered into GUI component Record Title 420. In other embodiments, each final procedure may include a single input value, such that there will be scores or hundreds of final procedures to enter the scores or hundreds of input values into the GUI component Record Title 420 during testing. Other GUI components may be hard-coded to single input values while GUI component Record Title 420 is being parametrized. For example, GUI component Media Type 450 may be hard-coded to "Audio", GUI component Format 460 may be hard-coded to "MP3", GUI component Uploader 470 may be hard-coded to "StevenT", and GUI component Publication Date 490 may be hard-coded to use a sub-process to select the current date (e.g., today).

For example, looking to the record upload GUI 400, the default procedure may have detected the inherent sequence of the page and have ordered the GUI component UPLOAD 492 to be entered last. However, a developer may want to verify that the GUI 400 returns an error if the GUI component UPLOAD 492 is entered before all required GUI components are selected, and may therein change the sequence of the final procedure to test the desired functionality. The testing program may receive these modifications and modify the default procedure into the final procedure accordingly. Alternatively, a default procedure may include the sequence as described but include no input values, and at block 240 the testing program may receive information on which GUI components will be parametrized and which GUI components will be hard-coded to specific input values. In this way one or all elements of the default procedure may be modified to create the final procedure that will be used in the test.

At block 250 the GUI may be tested by the testing program with the final procedure. The GUI may be tested by techniques known to one skilled in the art. For example, the GUI may be tested with a script that provides the determined GUI inputs in a graphical manner consistent with how a user of the GUI would execute a GUI command. The GUI may be tested with a plurality of final procedures generated by method 200 as described herein in a single session. The test may include final procedures for numerous GUIs of the hosting application as managed by the test case that navigates through the application and verifies how GUIs chain together.

At block 255 a coverage report of the GUI may be generated. The coverage of the GUI may be generated by the testing program in a display for a developer. The coverage may include the names of procedures/test cases, a list of the GUI components of the GUI that have been tested, data on whether or not GUI components were parametrized during said tests (and if so, how), data on whether or not GUI components were hard-coded on said tests (and if so, to what), or sequences in which the GUI was tested. In some embodiments, coverage of the GUI may be generated at any point during method 200. In such embodiments, the coverage may include data on any automated testing that has occurred up to that point in time (e.g., the point in time at which the coverage of the GUI is requested).

Figure 5:
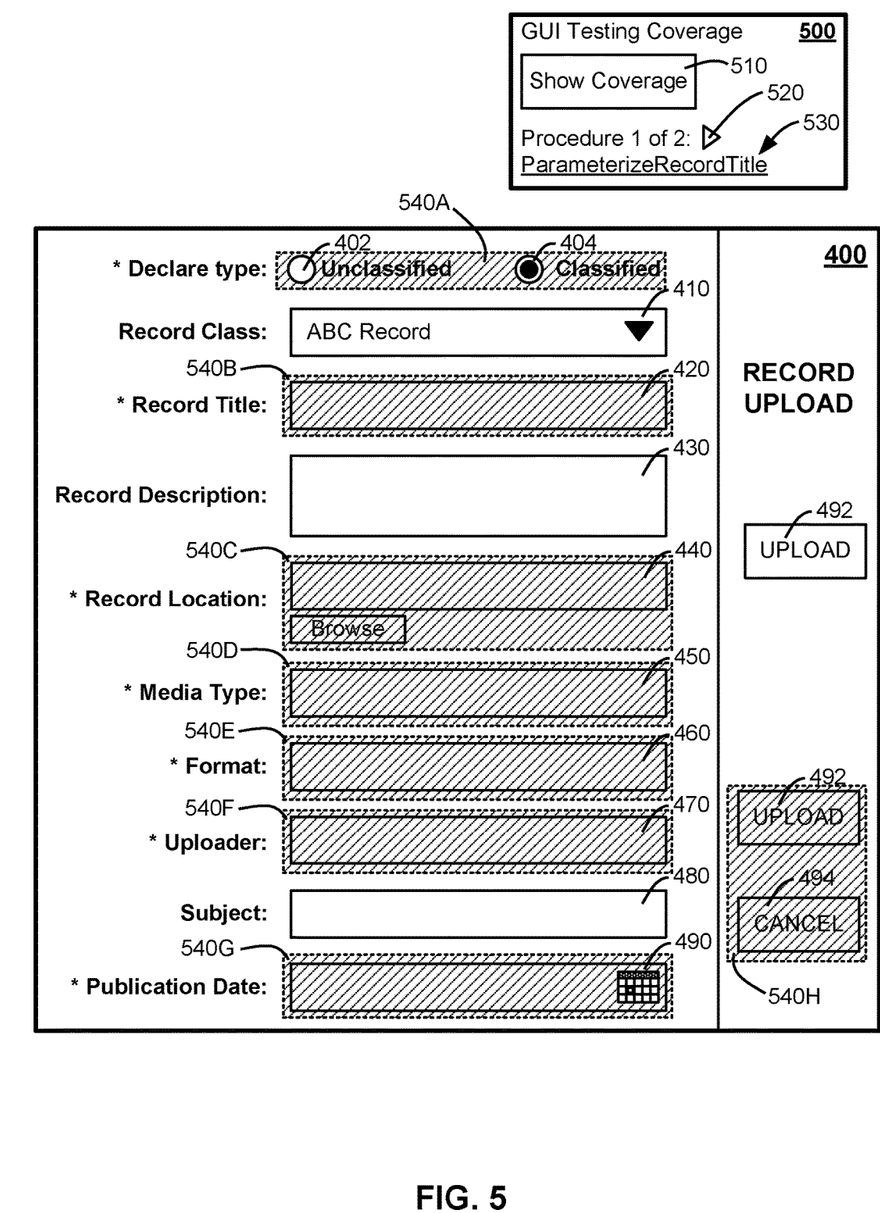
FIG. 5 is a depiction of a GUI testing coverage function being used on a record upload GUI, according to embodiments.

For example, looking to FIG. 5, a GUI testing coverage window 500 is depicted. The GUI testing coverage window 500 references the testing coverage of the Record Upload GUI 400 following the test at block 250. In embodiments, in order to bring up the testing coverage, a developer may select a GUI component within the testing program. For example, the developer may click upon the Record Location component 440 within the testing program. Once the Record Location component 440 is selected, the developer may request that the testing program display coverage of the selected GUI component by clicking on the Show Coverage button 510. Upon receiving the request to show testing coverage of the selected GUI component, the testing program may display final procedures that were used to test the selected GUI component. For example, in the GUI testing coverage window 500 the testing program displays a hyperlink ParameterizeRecordTitle 530 for the final procedure that was used to test the Record Upload GUI 400 at block 250. Clicking on this hyperlink 530 may bring up data on the final procedure as described above.

In some instances a GUI component may have been tested by more than one final procedure/test case, in response to which the testing program may display a plurality of final procedures/test cases. For example, in the GUI testing coverage window 500, the testing program informs the developer that the procedure ParameterizeRecordTitle is one of two procedures that have been used to test the GUI component. A developer may use the testing program to toggle to the second procedure with the use of an arrow button 520.

The testing program may indicate the GUI components that were utilized in the selected procedure within the Record Upload GUI 400. For example, as shown in FIG. 5, the procedure ParameterizeRecordTitle that was finalized at block 240 is selected. This procedure utilized a set of GUI components 402, 404, 420, 440, 450, 460, 470, 470, 490, 492, 494 as discussed above. As depicted, the testing program indicates within the Record Upload GUI 400 these selected GUI components 402, 404, 420, 440, 450, 460, 470, 470, 490, 492, 494 with indicators 540A-H such as shown in FIG. 5. While indicators 540A-H of FIG. 5 are hashed boxes, it is to be understood that other techniques known to one skilled in the art can be used to graphically indicate the selected GUI components of the selected procedure. Each selected GUI component may have a separate indicator 540. By graphically indicating the testing coverage of a GUI in this way a developer may easily identify and analyze the testing coverage of a GUI, including potentially identifying untested/undertested GUI components of a GUI that should be targeted by future procedures.

At block 260 the final procedure may be stored in a database. The database may store the final procedure, the selected GUI components that resulted in the final procedure, and the attributes of the GUI components. In some embodiments the results of the test and the GUI command are also stored in the database. The database may be organized in such a way that correlates procedures, GUI components, test cases, and the attributes (e.g., correlated such that querying for a GUI component will return a final procedure that uses the GUI component, or querying for an attribute will return the test cases that tested it, etc.).

At block 270 the final procedure may be retrieved from the database. The testing program may retrieve the final procedure in response to a request from the developer. Retrieving the final procedure includes gathering the data of the final procedure from the database such that the final procedure is ready for current use. A developer may retrieve the final procedure by selecting a GUI component of the final procedure. For example, looking to GUI 400 of FIG. 4, a developer may click on the GUI component UPLOAD 492 within the testing program. The testing program may use the database to identify stored procedures that used the GUI component UPLOAD 492. The final procedure may be identified as a procedure that included the GUI component UPLOAD 492 as a selected GUI component, and may therein be displayed to the developer. In some embodiments, the final procedure may be one of a plurality of procedures displayed to the developer. Any differences between these plurality of procedures (e.g., different sequences, different GUI components selected for parametrization, etc.) may be displayed and or highlighted to the developer (e.g., identical features of different procedures are graphically minimized upon presentation to the developer while distinct features are graphically emphasized through color or text size). The developer may select a final procedure, in response to which the testing program retrieves the final procedure from the database.

At block 280 the final procedure may be modified by the developer. The final procedure may be modified through different GUI input values or the inclusion of input values for different GUI components. For example, the final procedure generated at block 240 did not include input values for GUI component Record Class 410, GUI component Record Description 430, and GUI component Subject 480. In this example, the testing program may modify the retrieved procedure in response to developer requests to include values for these three GUI components 410, 430, 480. In some embodiments, once these three GUI components 410, 430, 480 are selected, the three GUI components may have attributes and default procedures determined by the testing program as in blocks 220 and 230, respectively. Regardless, a modified procedure may be determined as described herein (e.g., as discussed in block 240) that includes the three GUI components 410, 430, 480.

At block 290 the GUI may be tested with the retrieved/modified procedure. The GUI may be tested as described at block 250. After the GUI is tested the retrieved/modified procedure may be stored in the database as described above at block 260. Where the procedure was not modified, the new results may be added to the existing section of the database for the determined procedure. Where the procedure was modified, a new entry may be created for the modified procedure that includes the modified procedure, the GUI components of the modified procedure, the input values of the modified procedure, and the results of the test using the modified procedure.

The functionality outlined in the discussions herein regarding FIG. 1, FIG. 2, FIG. 3, and FIG. 4 above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for generating reusable testing methods, the method comprising:

receiving a selection of a plurality of graphical user interface (GUI) components of a GUI from a developer, wherein the GUI components are configured to execute one or more commands;

determining, automatically by a processor, attributes of the plurality of GUI components, wherein attributes include input values for GUI components and processes for providing respective admissible input values to respective GUI components;

determining, automatically by the processor and using the determined attributes, that two or more GUI components of the plurality of GUI components are mutually exclusive with each other;

generating, automatically by the processor, source code for testing the GUI using a default procedure, wherein the default procedure includes a first set of input values for GUI components of the plurality of GUI components and a first sequence, wherein the first sequence includes an order in which the first set of input values are provided to respective GUI components and an order in which the GUI components are executed during testing, the first sequence being automatically determined by the processor, the GUI components including a particular GUI component, the particular GUI component being one of the two or more mutually exclusive GUI components, wherein the particular GUI component is the only GUI component of the two or more mutually exclusive GUI components for which an input value is provided during testing, wherein the first set of input values includes a selection of a particular selectable element for a drop down GUI component having multiple selectable elements and default text for fillable fields of at least one GUI component, wherein the first set of input values is determined automatically by the processor based on historical input values for the GUI components, and wherein the default text for the at least one GUI component having a fillable field is gathered from a historical database, the historical database having GUI components that correspond to the at least one GUI component, and wherein the two or more mutually exclusive GUI components include at least two of a back button, a forward button, a submit button, an upload button, and a cancel button;

receiving, from the developer, modifications to the default testing procedure, the modifications including a second set of input values for GUI components of the plurality of GUI components and a second sequence, the second sequence including a second order in which the GUI components are executed during testing, and wherein the second set of input values includes a set of mutually exclusive GUI components;

modifying, by the processor and in response to receiving the modifications from the developer, the source code for testing the GUI using the default testing procedure to generate source code for testing the GUI using a final procedure, wherein modifying the source code for the default testing procedure to generate the source code for the final procedure includes replacing the first set of input values in the source code with the second set of input values, wherein the source code for the final procedure is configured to provide the second set of input values to the GUI components according to the second sequence to simulate the one or more commands, wherein certain GUI components of the plurality of GUI components are hard-coded to single input values across the final procedure, wherein other GUI components of the plurality of GUI components are parametrized to numerous input values based on the one or more commands, and wherein a single GUI component of the set of mutually exclusive GUI components is executed during testing;

compiling the source code for the final procedure into executable object code;

testing the GUI using the final procedure by executing the object code;

storing the final procedure in a database, wherein the database includes data on the plurality of GUI components;

retrieving the final procedure from the database in response to a prompt that includes a selection of at least one GUI component of the plurality of GUI components, wherein the prompt includes the one or more commands, and wherein the database stores the one or more commands;

generating a testing coverage report of the GUI using the database, the testing coverage report including a list of GUI components that have been tested by at least one final procedure of the database, a list of each of the at least one final procedures for respective GUI components, and results of testing procedures;

receiving a request for a testing coverage report for a GUI component of the plurality of GUI components;

identifying the final procedure as a procedure that tested the GUI component; and graphically indicating upon the GUI the plurality of GUI components that were tested by the final procedure.

* * * * *